(12) United States Patent
Takashita et al.

(10) Patent No.: US 8,970,986 B2
(45) Date of Patent: Mar. 3, 2015

(54) MAGNETIC HEAD AND MAGNETIC HEAD ASSEMBLY HAVING A SPIN TORQUE OSCILLATOR

(71) Applicant: Kabushiki Kaisha Toshiba, Tokyo (JP)

(72) Inventors: Masahiro Takashita, Kanagawa (JP); Shuichi Murakami, Tokyo (JP); Naoki Hase, Tokyo (JP); Katsuhiko Koui, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/915,529

(22) Filed: Jun. 11, 2013

(65) Prior Publication Data
US 2014/0160598 A1    Jun. 12, 2014

(30) Foreign Application Priority Data
Dec. 6, 2012    (JP) ................................. 2012-267016

(51) Int. Cl.
*G11B 5/127* (2006.01)
*G11B 5/187* (2006.01)
*G11B 5/147* (2006.01)

(52) U.S. Cl.
CPC ..................................... *G11B 5/147* (2013.01)
USPC ........................................................ 360/125.3

(58) Field of Classification Search
USPC ................................. 360/125.3, 128, 125.71
See application file for complete search history.

(56) References Cited

U.S. PATENT DOCUMENTS

| | | | |
|---|---|---|---|
| 7,616,412 B2 * | 11/2009 | Zhu et al. | 360/324.2 |
| 7,764,136 B2 | 7/2010 | Suzuki et al. | |
| 7,982,996 B2 * | 7/2011 | Smith et al. | 360/59 |
| 8,164,861 B2 * | 4/2012 | Braganca et al. | 360/313 |
| 8,320,080 B1 * | 11/2012 | Braganca et al. | 360/128 |
| 8,446,691 B2 * | 5/2013 | Takagishi et al. | 360/125.3 |
| 8,462,461 B2 * | 6/2013 | Braganca et al. | 360/125.3 |
| 8,553,362 B2 * | 10/2013 | Tanabe et al. | 360/125.3 |
| 8,564,904 B2 * | 10/2013 | Iwasaki et al. | 360/125.3 |
| 2005/0172991 A1 | 8/2005 | Arai et al. | |
| 2007/0291422 A1 | 12/2007 | Tsuchiya et al. | |
| 2010/0027158 A1 | 2/2010 | Takagishi et al. | |
| 2012/0120518 A1 * | 5/2012 | Matsubara et al. | 360/55 |
| 2012/0140354 A1 * | 6/2012 | Takeo et al. | 360/55 |
| 2012/0262821 A1 * | 10/2012 | Taguchi et al. | 360/99.08 |
| 2013/0335847 A1 * | 12/2013 | Shiroishi | 360/46 |

FOREIGN PATENT DOCUMENTS

JP    2006-332398 A    12/2006

* cited by examiner

*Primary Examiner* — Brian Miller
(74) *Attorney, Agent, or Firm* — Patterson & Sheridan, LLP (57) ABSTRACT

A magnetic head includes a main magnetic pole, a trailing shield that forms a magnetic circuit with the main magnetic pole, a spin torque oscillator that is provided between the main magnetic pole and the trailing shield, a first cooling layer that partially has a Heusler structure, and a second cooling layer that is provided on the first cooling layer and mainly comprised of silver. The first cooling layer and the second cooling layer are provided either between the main magnetic pole and spin torque oscillator or between the trailing shield and the spin torque oscillator, with either of the two cooling layers being disposed closer to the spin torque oscillator. A third cooling layer may be formed to be in contact with the first cooling layer.

13 Claims, 10 Drawing Sheets

MAGNETIC HEAD AND MAGNETIC HEAD ASSEMBLY HAVING A SPIN TORQUE OSCILLATOR

CROSS-REFERENCE TO RELATED APPLICATION(S)

This application is based upon and claims the benefit of priority from Japanese Patent Application No. 2012-267016, filed on Dec. 6, 2012, the entire contents of which are incorporated herein by reference.

FIELD

Embodiments of the present application relate to a magnetic head, a magnetic head assembly, and a magnetic recording-reproducing device.

BACKGROUND

A high frequency magnetic field assisted magnetic recording head including a spin torque oscillator can generate a high frequency magnetic field by passing a drive current through the spin torque oscillator. The high frequency magnetic field generated by the head allows data to be recorded in a magnetic recording medium and has a larger anisotropy than a magnetic field generated by a conventional head.

In order to increase the intensity of the high frequency magnetic field, it is preferred to rotate a magnetization of an oscillation layer formed in the spin torque oscillator by a large angle by passing a large drive current through the spin torque oscillator. However, if an excessively large drive current is passed, the spin torque oscillator heats up due to the current flow (i.e., Joule heat), and the lifetime of the spin torque oscillator is shortened due to element diffusion inside the spin torque oscillator. Further, if such an extremely large drive current is passed, the spin torque oscillator may be instantly broken. Therefore, the drive current has to be controlled at or below a certain level so that the spin torque oscillator will not be broken. However, this level of current may not be large enough to increase the intensity of the high frequency magnetic field to a desired level.

DETAILED DESCRIPTION

Embodiments in the present application is directed to provide a magnetic head that can obtain a sufficient intensity of the high frequency magnetic field while maintaining the heat generation caused by the current flow to a moderate level.

According to embodiments, a magnetic head includes a main magnetic pole, a trailing shield that forms a magnetic circuit with the main magnetic pole, a spin torque oscillator that is provided between the main magnetic pole and the trailing shield, a first cooling layer that partially has a Heusler structure, and a second cooling layer that is provided on the first cooling layer and mainly comprised of silver. The first cooling layer and the second cooling layer are provided either between the main magnetic pole and spin torque oscillator or between the trailing shield and the spin torque oscillator, with either of the two cooling layers being disposed closer to the spin torque oscillator. A third cooling layer may be formed to be in contact with the first cooling layer.

The magnetic head according to the embodiments is roughly classified into four types.

A magnetic head according to a first type includes: the main magnetic pole, the trailing shield that forms the magnetic circuit with the main magnetic pole, and the spin torque oscillator that is provided between the main magnetic pole and the trailing shield, wherein the spin torque oscillator, the second cooling layer, and the first cooling layer are laminated on the main magnetic pole in this order.

Further, in the magnetic head according to the first type, a drive current to drive the spin torque oscillator is passed from the spin torque oscillator to the first cooling layer.

A magnetic head according to a second type includes: the main magnetic pole, the trailing shield that forms the magnetic circuit with the main magnetic pole, and the spin torque oscillator that is provided between the main magnetic pole and the trailing shield, and the spin torque oscillator, the first cooling layer, and the second cooling layer are laminated on the main magnetic pole in this order.

Further, in the magnetic head according to the second type, a drive current to drive the spin torque oscillator is passed from the second cooling layer to the spin torque oscillator.

A magnetic head according to a third type includes: the main magnetic pole, the trailing shield that forms the magnetic circuit with the main magnetic pole, and the spin torque oscillator that is provided between the main magnetic pole and the trailing shield, and the second cooling layer, the first cooling layer, and the spin torque oscillator are laminated on the main magnetic pole in this order.

Further, in the magnetic head according to the third type, a drive current to drive the spin torque oscillator is passed from the second cooling layer to the spin torque oscillator.

A magnetic head according to a fourth type includes: the main magnetic pole, the trailing shield that forms the magnetic circuit with the main magnetic pole, and the spin torque oscillator that is provided between the main magnetic pole and the trailing shield, and the first cooling layer, the second cooling layer, and the spin torque oscillator are laminated on the main magnetic pole in this order.

Further, in the magnetic head according to the fourth type, a drive current to drive the spin torque oscillator is passed from the spin torque oscillator to the first cooling layer.

According to the embodiments, the second cooling layer and the first cooling layer are provided in the vicinity of the spin torque oscillator. The principal component of the second cooling layer is silver. The first cooling layer is formed on and in contact with the second cooling layer and at least partially has Heusler structure. Because the interface between the first and the second cooling layers is cooled due to a Peltier effect, when a drive current is passed through the spin torque oscillator, the spin torque oscillator is cooled. Therefore, even if an even larger drive current is passed, the spin torque oscillator will not be broken because the temperature of the spin torque oscillator can be maintained at a lower level. As a result, the intensity of the high frequency magnetic field can be increased while maintaining the spin torque oscillator at a lower temperature.

The first cooling layer used in the embodiments is a compound having Heusler structure, in order to obtain the Peltier effect.

The second cooling layer used in the embodiments is a metal for obtaining the Peltier effect. Further, a material of which lattice constant has a small difference from a lattice constant of a compound having Heusler structure, e.g. silver, is preferably used.

In the magnetic heads according to the first and fourth types, it is possible to further include a third cooling layer between the second cooling layer and the spin torque oscillator.

In the magnetic heads according to the second and third types, it is possible to further include the third cooling layer on the second cooling layer.

If the third cooling layer is further provided, the second cooling layer can work as an under layer to improve the quality of the first cooling layer. The third cooling layer works with the first cooling layer and causes the Peltier effect. As a result, while the spin torque oscillator is sufficiently cooled, the intensity of the high frequency magnetic field can be increased.

$Co_2FeSi$ can be a principal component of the first (and third) cooling layer. Because $Co_2FeSi$ is used for the cooling layer, the B2 structure or the $L2_1$ structure can be obtained without a special heat treatment. Thus, the cooling layer can be formed without negatively affecting the spin torque oscillator.

The spin torque oscillator can include an oscillation layer, a spin injection layer, and an intermediate layer formed between the oscillation layer and the spin injection layer. A current can flow from the spin injection layer to the oscillation layer. With such structure of the spin torque oscillator, the high frequency assisted magnetic head that allows a further excellent high frequency assisted magnetic field to be generated can be obtained.

A magnetic head assembly according to the embodiments includes the magnetic head according to one of the first and fourth types, a head slider on which the magnetic head is mounted, a suspension on one end of which the head slider is mounted, and an actuator arm connected to another end of the suspension.

Due to the spin torque oscillator that is cooled by the Peltier effect, it is possible to generate a high frequency magnetic field during recording.

The magnetic recording-reproducing device according to the embodiment includes a magnetic recording medium, the magnetic head according to one of the first and fourth types, the head slider on which the magnetic head is mounted, the suspension on the one end of which the head slider is mounted, and an actuator arm connected to the other end of the suspension.

The Peltier effect is an effect that, when different type materials are joined with each other and a current is passed through the junction, heat absorption or heat release occurs at the junction. For an element to cause the Peltier effect (a Peltier element), a semiconductor material, such as a bismuth-tellurium system, a lead-tellurium system, and a silicon-germanium system, has been used.

However, for the spin torque oscillator used for the high frequency assisted magnetic recording head, the semiconductor material is not preferable. Because the semiconductor material generally has extremely large resistivity, it is impossible to flow a large current.

In the embodiments, to obtain the cooling effect, a Heusler alloy and a normal metal are used and a metal-Heusler alloy junction is created.

Figure 1:
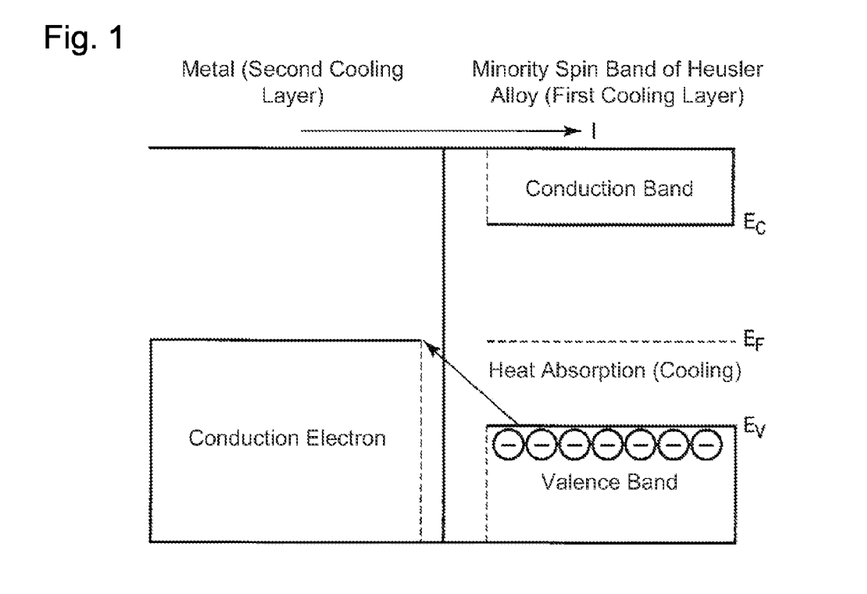
FIG. 1 is a schematic view for explaining a mechanism of heat generation and heat absorption of a metal-Heusler alloy junction part.

FIG. 1 is a schematic view for explaining a mechanism of heat generation and heat absorption of a metal-Heusler alloy junction part.

Many alloys having the Heusler structure (Heusler alloys) are substances called a half-metal. The half-metal is a material that has the density of states at Fermi energy in a majority spin band, but does not have the density of states in a minority spin band. Therefore, in the case of electrons having majority spin, resistivity thereof is small and a half-metal works as a material in which normal metallic conduction occurs; but on the other hand, in the case of the conduction of electrons having minority spin, a half-metal works as an insulator, or a semiconductor when an energy gap is small.

When a current is passed through the metal-Heusler alloy junction part from the metal toward the Heusler alloy, electrons flow from the Heusler alloy toward the metal. In many cases, the energy gap in the minority spin band of the Heusler alloy is about several electron volts (eV). Because of this energy gap, in near room temperature, electrons in a valence band are not likely to be thermally excited to a conduction band. Therefore, when the electrons in the valence band of the minority spin band of the Heusler alloy move to the metallic conductor, energy equivalent to a degree of EF-EV is absorbed and cooling effect is obtained.

Furthermore, as compared to the Ms (Saturation Magnetization) of CoFeNi material (about 1.9 T), which is generally used for a trailing shield, the Ms of a material having the Heusler structure is about 1 T. When the oscillation layer of the spin torque oscillator is positioned near the trailing shield, due to magnetic coupling of the oscillation layer and the trailing shield, oscillation of a magnetization by the oscillation layer is suppressed so that the intensity of the high frequency magnetic field becomes smaller. On the other hand, according to the embodiments, because a material having a smaller Ms is provided between the oscillation layer and the trailing shield, the effect of the magnetic coupling becomes smaller. Thus, more intense high frequency magnetic field can be obtained.

A problem here is that a simple film formation is generally insufficient to obtain the Heusler structure (B2 structure or $L2_1$ structure), and a heat treatment at a high temperature is required. The temperature of heat treatment used for manufacturing a head for a hard disk can be at most about 300° C. On the other hand, the temperature of heat treatment required to obtain the Heusler structure is generally 300° C. or more, and also sometimes the temperature should be about 500° C. Thereby, it has been difficult to apply the Heusler materials to the head for a hard disk.

As described above, in the magnetic head according to the embodiments, $Co_2FeSi$ can be used as the Heusler material. $Co_2FeSi$ has the characteristic that the Heusler structure such as B2 or $L2_1$ can be obtained without the heat treatment. Therefore, even for the recording head, which has the strict regulation in the heat treatment temperature as described above, the Heusler material can be applied to obtain the cooling effect.

Hereinafter, detail descriptions of the embodiment are given showing examples.

First Embodiment

Figure 2:
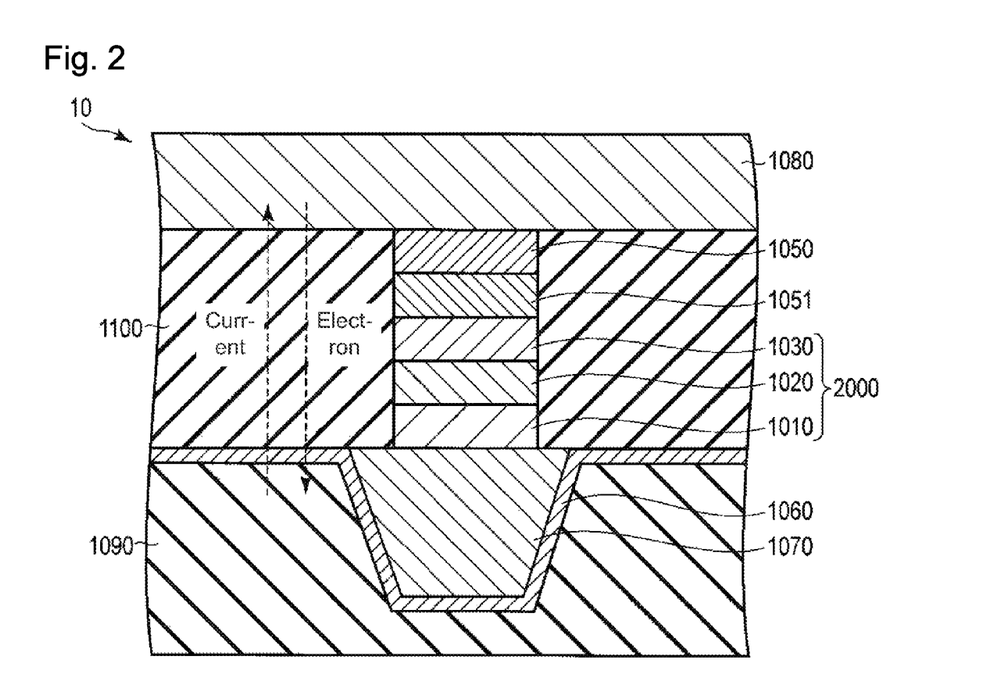
FIG. 2 is one example of a configuration of a high frequency assisted magnetic head according to a first embodiment.

FIG. 2 illustrates one example of the configuration of a high frequency magnetic field assisted recording head 10 according to a first embodiment.

A manufacture order is forming from a first insulator 1090 to a trailing shield 1080. For the first insulator (1090), an Al—Ti—C substrate having a thickness of 1.25 mm is preferably used. A main magnetic pole 1070 is formed by a plating method on a seed layer 1060, which is made of Ru, for example, having a thickness of 5 nm. The main magnetic pole 1070 can be formed by another method such as a sputtering, etc., other than the plating method. The main magnetic pole 1070 and the seed layer 1060 are provided in a dent formed on the first insulator 1090.

The reference number 2000 denotes a spin torque oscillator. The spin torque oscillator 2000 is formed of an oscillation layer 1030 that generates a high frequency magnetic field, a spin injection layer 1010 that injects spin-polarized electrons, and an intermediate layer 1020 formed therebetween.

For the spin injection layer 1010, a CoCr type magnetic materials, such as CoCrPt, CoCrTa, CoCrTaPt, CoCrTaNb, etc., of which magnetization is oriented in a perpendicular-to-film-surface direction, an RE-TM type amorphous alloy magnetic materials, such as TbFeCo, etc., a Co artificial lattice magnetic materials, such as Co/Ni, FeCo/Ni, Co/Pd, FeCo/Ni, Co/Pt, CoCrTa/Pd, etc., an alloy magnetic materials such as a CoPd type alloy, a CoPt type alloy, a FePt type alloy, and a SmCo type alloy can be used as a material that performs a preferable perpendicular orientation. Also, a plurality of the above-described materials may be laminated. Furthermore, at least one type of material selected from Al (aluminum), Ge (germanium), Si (silicon), Ga (gallium), B (boron), C (carbon), Se (selenium), and Sn (tin) may be included in such materials. Here, CoPt having a thickness of 20 nm formed by the sputtering method is used.

It is preferred that a material used for the oscillation layer (1030) has a high spin polarization and a small magnetic damping coefficient. Such materials include, for example, a soft magnetic material having a relatively large saturation magnetic flux density and a magnetic anisotropy in a direction parallel to the film surface, such as CoFe, CoNiFe, NiFe, CoZrNb, FeN, FeSi, FeAlSi, etc. and a magnetic alloy film formed of CoCr type alloy of which magnetization is oriented in a direction parallel to the film surface. Furthermore, a CoCr type magnetic alloy such as CoCrPt, CoCrTa, CoCrTaPt, CoCrTaNb, etc., of which magnetization is oriented in the perpendicular-to-film-surface direct direction, an RE-TM type amorphous alloy such as TbFeCo, etc., a Co artificial lattice magnetic material such as Co/Ni, FeCo/Ni, Co/Pd, FeCo/Ni, Co/Pt, CoCrTa/Pd, etc., a magnetic alloy such as a CoPd type alloy, a CoPt type alloy, a FePt type alloy, and a SmCo type alloy, etc. can be used as a material that performs a preferable perpendicular orientation. Also, a plurality of the above-described materials may be laminated. Furthermore, at least one type of material selected from Al (aluminum), Ge (germanium), Si (silicon), Ga (gallium), B (boron), C (carbon), Se (selenium), and Sn (tin) may be included in such materials. Here, FeCo having a thickness of 10 nm formed by the sputtering method is used.

The reference number 1051 denotes a second cooling layer. The second cooling layer 1051 corresponds to the metal in FIG. 1. A known metal can be preferably used for the second cooling layer 1051. The second cooling layer 1051 of which principal component is Ag has a good matching in the lattice constant with the Heusler alloy and this improves the film quality of a first cooling layer 1050, which is described later, so that the second cooling layer is further preferably used. It is possible to add up to 4 atom % Sn or up to 4 atom % Ge with respect to Ag in the second cooling layer 1051. When Sn or Ge with a concentration higher than above-description is added, a spin diffusion length becomes extremely short and spin data of electrons that contribute to electrical conduction may be erased, and therefore there is a tendency that the cooling effect cannot be obtained. In addition, metal nitride can also be used for the second cooling layer 1051. Specifically, potassium nitride, calcium nitride, scandium nitride, titanium nitride, vanadium nitride, chromium nitride, manganese nitride, and iron nitride can be used. In the example of this embodiment, Ag having a thickness of 4 nm formed by the sputtering method is used.

The reference number 1050 denotes a first cooling layer. The first cooling layer 1050 corresponds to the Heusler alloy in FIG. 1. When the known Heusler material used, an energy gap is formed in the minority spin band, so that the cooling effect of the spin torque oscillator 2000 is obtained. The Heusler alloy includes, for example, $Co_2CrAl$, $Fe_2MnSi$, $Ru_2MnSi$, $Ru_2MnGe$, $Ru_2MnSn$, $Co_2MnSi$, $Co_2MnGe$, $Co_2MnSn$, $Mn_2VAl$, $Mn_2VGe$, $Fe_2VAl$, $Co_2TiAl$, $Fe_2CrAl$, $Co_2TiSn$, $CO_2VAl$, $Fe_2MnAl$, $Rh_2MnIn$, $Rh_2MnTl$, $Co_2MnAl$, $Co_2MnGa$, $Rh_2MnAl$, $Rh_2MnGa$, $Ru_2MnSb$, $Rh_2MnGe$, $Rh_2MnSn$, $Rh_2MnPb$, $Co_2MnAs$, $Co_2FeAl$, $Ni_2MnAl$, and $Co_2MnSb$. In the example of this embodiment, $Co_2FeSi$ is used. Further, the first cooling layer 1050 has a thickness of 6 nm and is formed by the sputtering method. In the example of this embodiment, four samples of the first cooling layer 1050 are prepared, i.e. the first cooling layer 1050 formed of $Co_2FeSi$, $Co_2MnGe$, $Co_2MnAl$, and $Co_2MnSi$, respectively. Further each of the layers has a thickness of 6 nm and is formed by the sputtering method.

The reference number 1100 denotes a second insulator. After the materials for the spin torque oscillator 2000, the second cooling layer 1051, and the first cooling layer 1050 are formed on the seed layer 1060 and the main magnetic pole 1070, a portion around the spin torque oscillator 2000, the second cooling layer 1051, and the first cooling layer 1050 is trimmed, by ion milling, etc., to have a predetermined dimensional size. Then the second insulator 1100 is formed at the trimmed portion.

The reference number 1080 denotes the trailing shield. The trailing shield 1080 is a part to which a recording magnetic field generated from the main magnetic pole 1070 extends.

In addition, an under layer formed from Ta, Ru, or Cu, or an under layer formed from a plurality of them (not shown in FIG. 2) may be provided between the main magnetic pole 1070 and the spin injection layer 1010. Also, between the first cooling layer 1050 and the trailing shield 1080, a cap layer selected from Cu, Ta, Ru, etc, for example, (not shown in FIG. 2) may be provided.

To form the first cooling layer 1050, the second cooling layer 1051, and the spin torque oscillator 2000, a sputtering method, a plating method, a CVD method, and an application process, etc., are preferably used. With respect to the sputtering method, the layer is preferably formed at the degree of vacuum of between 10 mtorr and 50 mtorr. If the degree of vacuum is lower than 10 mtorr, it is impossible to form a film because plasma will not occur. If the degree of vacuum is higher than 50 mtorr, the film quality will be deteriorated. A preferred film formation speed is between 0.1 angstrom/sec-1 angstrom/sec. When the film formation speed is lower than 0.1 angstrom/sec, the film formation speed cannot be controlled well, and if the film formation speed is higher than 1 angstrom/sec, the film quality tends to be deteriorated.

For a target of the sputtering, an alloy target can be used. Also, it is possible to perform co-sputtering using plural targets. For example, when a cooling layer made of $Co_2FeSi$ is formed, it is possible to form the cooling layer by the sputtering method using a $Co_2FeSi$ target. Also, it is possible to form the cooling layer by co-sputtering using a Co target and a FeSi target, a $Co_2Fe$ target and a Si target, or a $Co_2Si$ target and a Fe target.

Also, it is preferable to form the spin torque oscillator 2000, the first cooling layer 1050, and the second cooling layer 1051 while the substrate on which the head is formed is being heated. Normally, because Ag and an alloy thereof has a fcc structure, a (001) surface becomes a lamination surface; and because the $L2_1$ structure and B2 structure of the Heusler material is a combined crystal structure of a bcc structure, a (110) surface becomes a lamination surface. However, when the method in which the formation is performed as the substrate is heated as described above is used, in both of the cases, (001) surfaces become the lamination surfaces. Thereby, further bigger cooling effect can be obtained. In heating the substrate, the substrate is preferably heated to 300° C.-600° C., for example. Also, a film formation speed thereof is preferably between 0.1 angstrom/sec-0.2 angstrom/sec.

Figure 19:
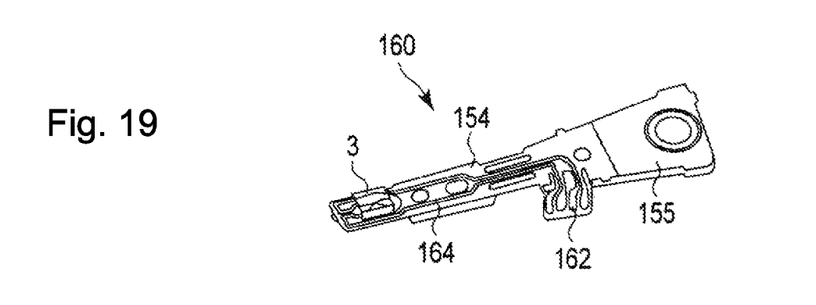
FIG. 19 is an enlarged perspective view from a disk side of a magnetic head assembly according to the embodiments.

A current passage mechanism (not shown in FIG. 2) is provided in the structure of the high frequency magnetic field assisted magnetic head 10. For example, lead lines 164 in FIG. 19 are connected to the main magnetic pole 1070 and the trailing shield 1080. A drive current is passed through the lead lines by a head amplifier 202 (shown in FIG. 20), for example. A current is passed through the spin injection layer 1010, the intermediate layer 1020, the oscillation layer 1030, the second cooling layer 1051, and the first cooling layer (1050) in this order. Thus, electrons conversely flow from the first cooling layer 1050 toward the spin injection layer 1010. During the flow of the electrons, when the electrons move from the first cooling layer 1050 to the second cooling layer 1051, the interface between the first cooling layer 1050 and the second cooling layer 1051 is cooled because of the mechanism illustrated in FIG. 1. The electrons exit out from the spin torque oscillator 2000 as the electrons retain the received thermal energy. As a result, since the interface between the first cooling layer 1050 and the second cooling layer 1051 is cooled, the spin torque oscillator 2000 adjacent thereto is cooled as well. It is preferred to use the main magnetic pole 1070 and the trailing shield 1080 as electrodes for passing a current through the spin torque oscillator 2000, etc. because this simplifies the structure.

The thickness of the first cooling layer 1050 is preferably 0.5 nm or more. When the thickness is too thin, i.e. less than 0.5 nm, sufficient spin polarization becomes less likely to occur inside the first cooling layer 1050, and as a result, a cooling effect will be insufficient. On the other hand, when the first cooling layer 1050 is too thick, a gap between the main magnetic pole 1070 and the trailing shield 1080 is too wide, and the recording in the high recording density will be very difficult. Therefore, the thickness of the first cooling layer 1050 can be determined based on the balance with the recording density, but the thickness should be at least 0.5 nm or more.

The thicknesses of the second cooling layer 1051 and the under layer are preferably 1 nm or more. If the thicknesses are excessively thin, forming an under layer and a second cooling layer 1051 may not be formed with good quality. On the other hand, if the second cooling layer 1051 and the under layer are excessively thick, the gap between the main magnetic pole 1070 and the trailing shield 1080 will be too wide, and the recording with the high recording density will be very difficult.

Therefore, the thicknesses of the second cooling layer 1051 and the under layer can be determined based on the balance with the recording density, but the thickness should be at least 1 nm or more.

Second Embodiment

Figure 3:
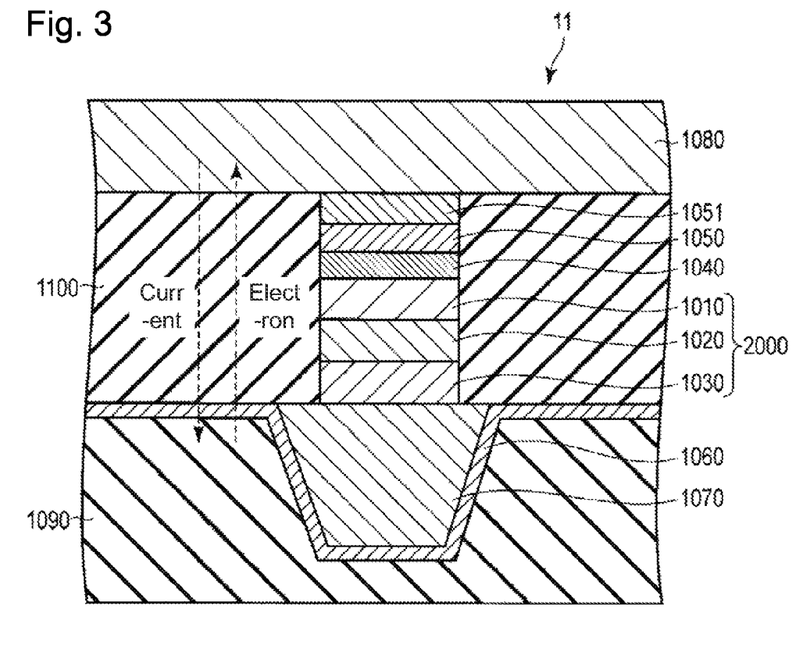
FIG. 3 is one example of the configuration of the high frequency assisted magnetic head according to a second embodiment.

FIG. 3 illustrates one example of the configuration of a high frequency magnetic field assisted recording head 11 according to a second embodiment.

The direction of a current is opposite to that in the example of the first embodiment.

In this case, the spin torque oscillator 2000 is formed such that the oscillation layer 1030 is positioned on the main magnetic pole 1070.

In the current example, the oscillation layer 1030 is formed of FeCo by using a sputtering method and has a thickness of 10 nm. The main magnetic pole 1070 is formed of FeCo by using a plating method and has a thickness of 50 nm.

Because the orientation of current to pass is opposite from the spin torque oscillator 2000 in FIG. 2, the lamination order of the first cooling layer 1050 and the second cooling layer 1051 needs to be reversed to the order in FIG. 2 in order to obtain the cooling effect. However, in this case, when the first cooling layer 1050 is formed directly on the spin injection layer 1010, the film quality of the first cooling layer 1050 will not be sufficient. In order to solve this problem, an under layer 1040 is manufactured on the spin injection layer 1010. For the under layer 1040 Ag having a thickness of 3 nm formed by a sputtering method is used. Ag is a material the same as the material of the second cooling layer 1051. In the current example, four samples of the first cooling layer 1050 are prepared. Thus, the first cooling layers 1050 are formed of $Co_2FeSi$, $Co_2MnGe$, $Co_2MnAl$, and $Co_2MnSi$, respectively, on the under layer 1040, and each of the films has a thickness of 6 nm. Thereafter, a heat treatment at 220° C. is performed. As a result, the lattice constant of the under layer 1040 matches with the lattice constant of the first cooling layer 1050, and this improves the film quality of the first cooling layer 1050. Therefore, preferable cooling effect can be obtained.

The reference number 1051 denotes the second cooling layer. The second cooling layer 1051 corresponds to the metal in FIG. 1. A known metal can be used for the second cooling layer 1051. The second under layer of which principal component is Ag has a good matching in the lattice constant with the Heusler alloy and this improves the film quality of the first cooling layer 1050, so that the second under layer is further preferably used. It is possible to add up to 4 atom % Sn or up to 4 atom % Ge with respect to Ag in the second cooling layer 1051. If more than this amount of Sn or Ge is added, a spin diffusion length becomes extremely short and spin data of electrons that contribute to electrical conduction may be erased. Therefore, the cooling effect cannot be obtained. In addition, metal nitride can also be used for the second layer 1051. Specifically, potassium nitride, calcium nitride, scandium nitride, titanium nitride, vanadium nitride, chromium nitride, manganese nitride, and iron nitride can be used. In the present example, an Ag layer having a thickness of 3 nm is formed by a sputtering method.

The reference number 1100 denotes the second insulator. After the materials for the spin torque oscillator 2000, the second cooling layer 1051, and the first cooling layer 1050 are formed on the seed layer 1060 and the main magnetic pole 1070, a portion around the spin torque oscillator 2000, the second cooling layer 1051, and the first cooling layer 1050 is trimmed to have a predetermined dimensional size by ion milling, etc. Then, the trimmed portion is embedded with the second insulator. In the current example, $Al_2O_3$ having a thickness of 50 nm formed by an ALD method is used.

The reference number 1080 denotes the trailing shield. The trailing shield is a part to which a recording magnetic field generated from the main magnetic pole extends.

Note, an under layer formed from Ta, Ru, or Cu, or an under layer formed from a plurality of them (not shown in FIG. 3) may be provided between the main magnetic pole 1070 and the spin injection layer 1010. Also, between the first cooling layer 1050 and the trailing shield 1080, a cap layer (not shown in FIG. 3) may be provided.

A current passage mechanism (not shown in FIG. 3) is provided in the structure of the high frequency magnetic field assisted magnetic head. For example, the lead lines 164 in FIG. 19 are connected to the main magnetic pole 1070 and the trailing shield 1080. A drive current and passed through the lead lines by a head amplifier (not illustrated), for example. A current is passed through the second cooling layer 1051, the first cooling layer 1050, the under layer 1040, spin injection layer 1010, the intermediate layer 1020, and the oscillation layer 1010 in this order. Thus, electrons conversely flow from the oscillation layer 1030 toward the second cooling layer 1051. At this time, when the electrons move from the first cooling layer 1050 to the second cooling layer 1051), according to the mechanism illustrated in FIG. 1, the cooling occurs in an interface between the first cooling layer 1050 and the second cooling layer 1051. The electrons exit out from the spin torque oscillator 2000 as the electrons retain the received thermal energy.

Note, when electrons move from the under layer 1040 to the first cooling layer 1050, the interface between the under layer 1040 and the first cooling layer 1050 will be heated due to a reverse mechanism to that illustrated in FIG. 1. However, the recording signals are measured, and the negative effect due to the heating is not as extensive as expected. It seems that the cooling effect caused when a current flows from the second cooling layer to the first cooling layer works more extensively in the configuration of the high frequency magnetic field assisted magnetic head 11. As a result, since the interface between the first cooling layer 1050 and the second cooling layer 1051 is cooled, the spin torque oscillator 2000 adjacent thereto is cooled as well. In addition, since the main magnetic pole 1070 and the trailing shield 1080 are used as electrodes for passing a current through the spin torque oscillator 2000, etc., the structure of the magnetic head 11 can be made simple.

Third Embodiment

Figure 4:
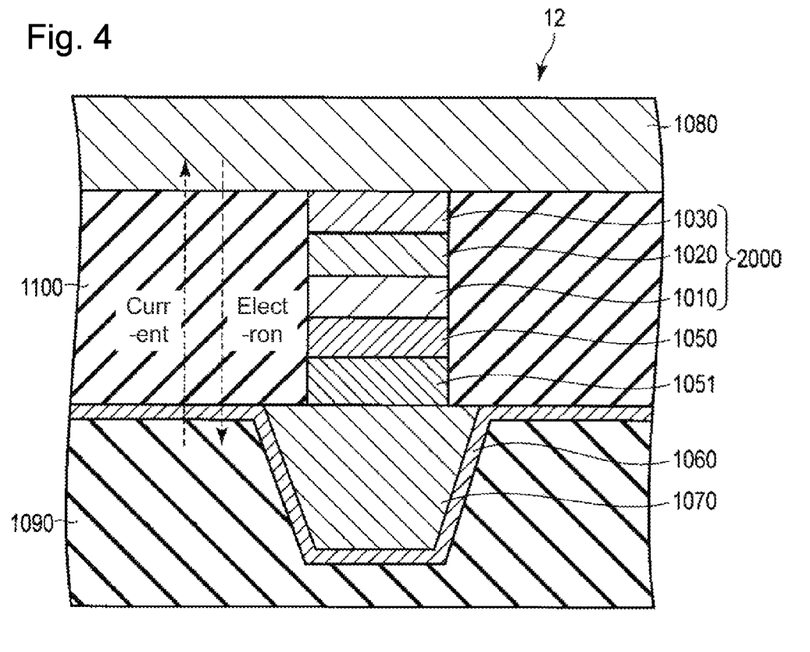
FIG. 4 is one example of the configuration of the high frequency assisted magnetic head according to a third embodiment.

FIG. 4 illustrates one example of the configuration of the high frequency magnetic field assisted recording head 12 according to a third embodiment.

A high frequency magnetic field assisted recording head 12 has a lamination order that is reversed to the lamination order of the spin torque oscillator 2000 and a pair of the first cooling layer 1050 and the second cooling layer 1051 of the high frequency magnetic field assisted recording head illustrated in FIG. 2. In the current example, respectively using $Co_2FeSi$, $Co_2MnGe$, $Co_2MnAl$, and $Co_2MnSi$ for the first cooling layer 1050, four samples are prepared by a sputtering method on the spin torque oscillator 2000 having a thickness of 50 nm.

Fourth Embodiment

Figure 5:
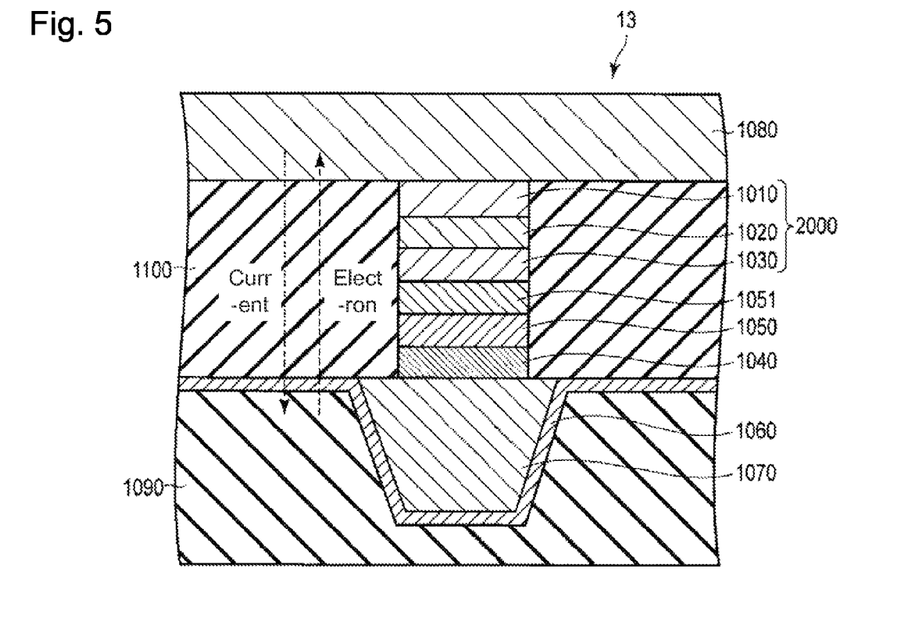
FIG. 5 is one example of the configuration of the high frequency assisted magnetic head according to a fourth embodiment.

FIG. 5 illustrates one example of the configuration of a high frequency magnetic field assisted recording head 13 according to a fourth embodiment.

A high frequency magnetic field assisted recording head 13 has a lamination order that is reversed to the lamination order of the spin torque oscillator 2000 and a set of the under layer 1040, the first cooling layer 1050, and the second cooling layer 1051 of the high frequency magnetic field assisted recording head 11 illustrated in FIG. 3. In the current example, respectively using $Co_2FeSi$, $Co_2MnGe$, $Co_2MnAl$, and $Co_2MnSi$ for the first cooling layer 1050, four samples are prepared by a sputtering method on the spin torque oscillator 2000 having a thickness of 50 nm.

Fifth Embodiment

Figure 6:
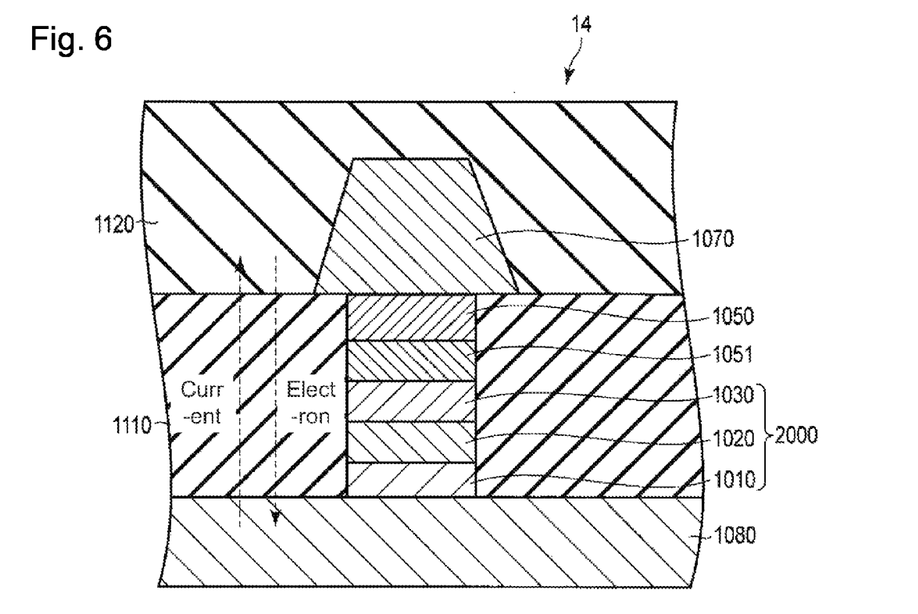
FIG. 6 is one example of the configuration of the high frequency assisted magnetic head according to a fifth embodiment.

FIG. 6 illustrates one example of the configuration of a high frequency magnetic field assisted recording head 14 according to a fifth embodiment.

In the high frequency magnetic field assisted recording head 14, the trailing shield 1080 is formed first, and the main magnetic pole 1070 is formed last. The trailing shield 1080 is formed on a substrate not shown in FIG. 6 made of ALTIC (Al—Ti—C), for example. On the trailing shield 1080, the spin injection layer 1010, the intermediate layer 1020, the oscillation layer 1030, the second cooling layer 1051, and the first cooling layer 1050 are formed in this order. In the current example, respectively using $Co_2FeSi$, $Co_2MnGe$, $Co_2MnAl$, and $Co_2MnSi$ for the first cooling layer 1050, four samples are prepared by a sputtering method on the spin torque oscillator 2000 having a thickness of 50 nm. After that, a portion around the materials for the first cooling layer 1050 to the spin injection layer 1010 is trimmed by ion milling, etc. Then, the trimmed portion is filled with a third insulator 1110. The main magnetic pole 1070 is formed on this by a plating method, for example. The seed layer 1060 illustrated in FIG. 2 is not necessary. In addition, the main magnetic pole 1070 can be formed by another method such as a sputtering, etc., other than the plating method. After this, the shape of the main magnetic pole 1070 is adjusted by a method such as ion milling, and a fourth insulator 1120 is formed on the main magnetic pole 1070.

In this configuration, the drive current is passed through the spin injection layer 1010, the intermediate layer 1020, the oscillation layer 1030, the second cooling layer 1051, and the first cooling layer 1050 in this order. In other words, electrons conversely flow from the first cooling layer 1050 toward the spin injection layer 1010. At this time, when electrons move from the first cooling layer 1050 to the second cooling layer 1051, according to the mechanism illustrated in FIG. 1, the cooling occurs in an interface between the first cooling layer 1050 and the second cooling layer 1051. The electrons exit out from the spin torque oscillator 2000 as the electrons retain the received thermal energy. As a result, through the cooling in the interface between the first cooling layer 1050 and the second cooling layer 1051, the spin torque oscillator 2000 adjacent thereto is cooled as well. In addition, when the main magnetic pole 1070 and the trailing shield 1080 are used as electrodes for passing a current through the spin torque oscillator 2000, etc., the structure of the magnetic head 14 can be simplified.

Sixth Embodiment

Figure 7:
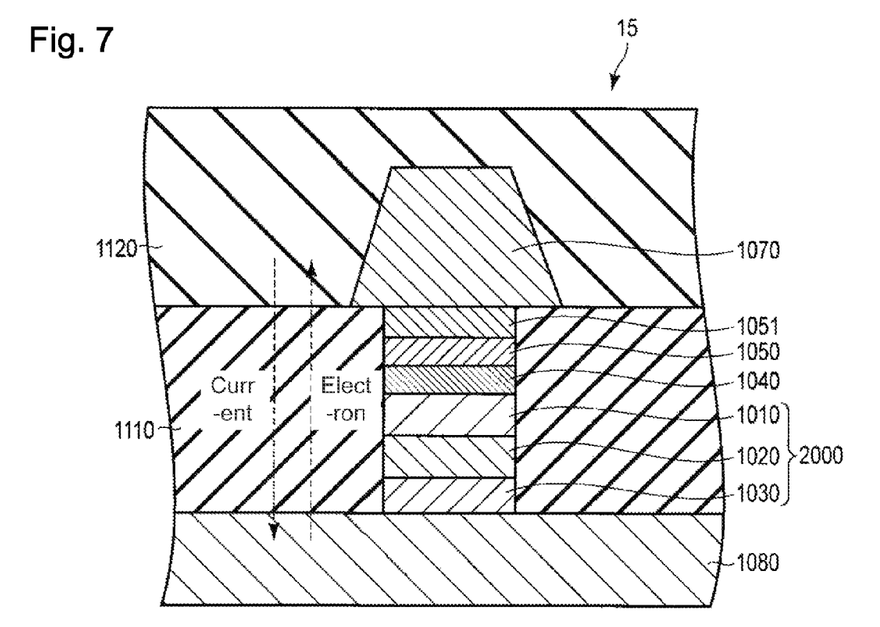
FIG. 7 is one example of the configuration of the high frequency assisted magnetic head according to a sixth embodiment.

FIG. 7 illustrates one example of the configuration of a high frequency magnetic field assisted recording head 15 according to a sixth embodiment.

A high frequency magnetic field assisted recording head 15 has a lamination order that is reversed to the lamination order of the spin injection layer 1010 and the oscillation layer 1030 of the spin torque oscillator 2000 of the high frequency magnetic field assisted recording head illustrated in FIG. 6, a lamination order that is reversed to the lamination order of the pair of the first cooling layer 1050 and the second cooling layer 1051, and has a current passage direction the same as the one of FIG. 3. Herein, respectively using $Co_2FeSi$, $Co_2MnGe$, $Co_2MnAl$, and $Co_2MnSi$ for the first cooling layer 1050, four samples are prepared by a sputtering method on the spin torque oscillator 2000 having a thickness of 50 nm.

Seventh Embodiment

Figure 8:
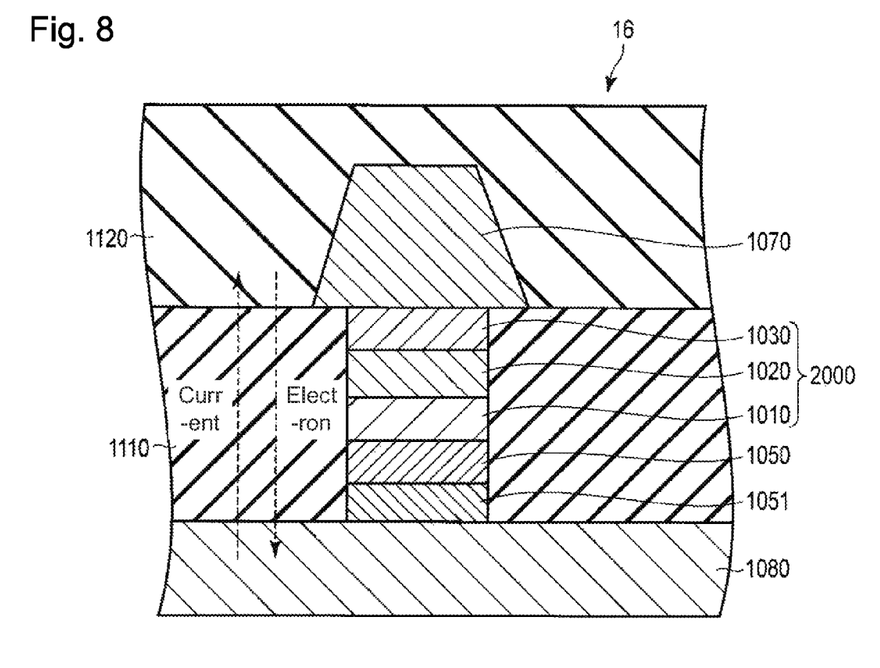
FIG. 8 is one example of the configuration of the high frequency assisted magnetic head according to an seventh embodiment.

FIG. 8 illustrates one example of the configuration of a high frequency magnetic field assisted recording head 16 according to a seventh embodiment.

A high frequency magnetic field assisted recording head 16 has a lamination order that is reversed to the lamination order of the spin torque oscillator 2000 and the pair of the first cooling layer 1050 and the second cooling layer 1051 of the high frequency magnetic field assisted recording head illustrated in FIG. 6. In the current example, respectively using $Co_2FeSi$, $Co_2MnGe$, $Co_2MnAl$, and $Co_2MnSi$ for the first cooling layer 1050, four samples are prepared by a sputtering method on the spin torque oscillator 2000 having a thickness of 50 nm.

Eighth Embodiment

Figure 9:
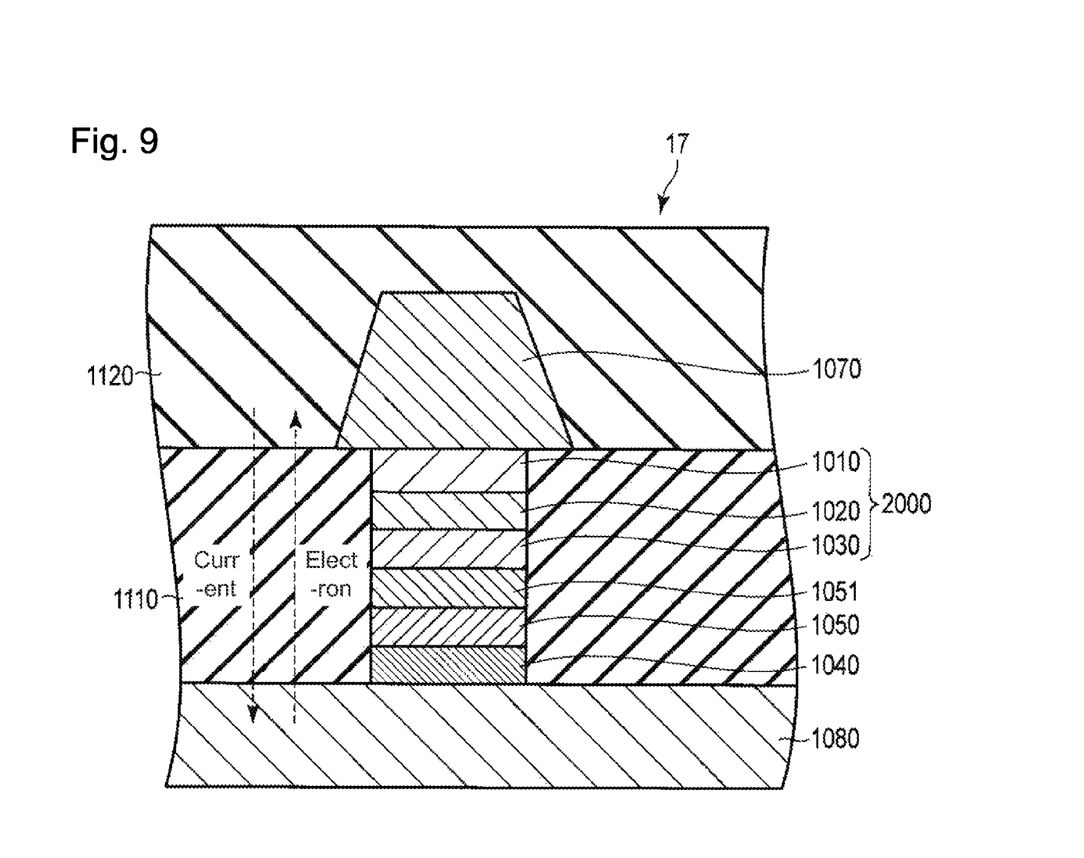
FIG. 9 is one example of the configuration of the high frequency assisted magnetic head according to the eighth embodiment.

FIG. 9 illustrates one example of the configuration of a high frequency magnetic field assisted recording head 17 according to an eighth embodiment.

A high frequency magnetic field assisted recording head 17 has a lamination order that is reversed to the lamination order of the spin torque oscillator 2000 and the set of the under layer 1040, the first cooling layer 1050, and the second cooling layer 1051 of the high frequency magnetic field assisted recording head illustrated in FIG. 7. In the current example, respectively using $Co_2FeSi$, $Co_2MnGe$, $Co_2MnAl$, and $Co_2MnSi$ for the first cooling layer (1050), four samples are prepared by a sputtering method on the spin torque oscillator 2000 having a thickness of 50 nm.

Recording heads 10 through 17 were manufactured with respect to the four samples of each of the first through eighth embodiments. Then, data was recorded in the magnetic recording medium using the heads, and recording signals reproduced therefrom were measured.

Results of the recording signals are shown in FIG. 10 through FIG. 17.

Figure 10:
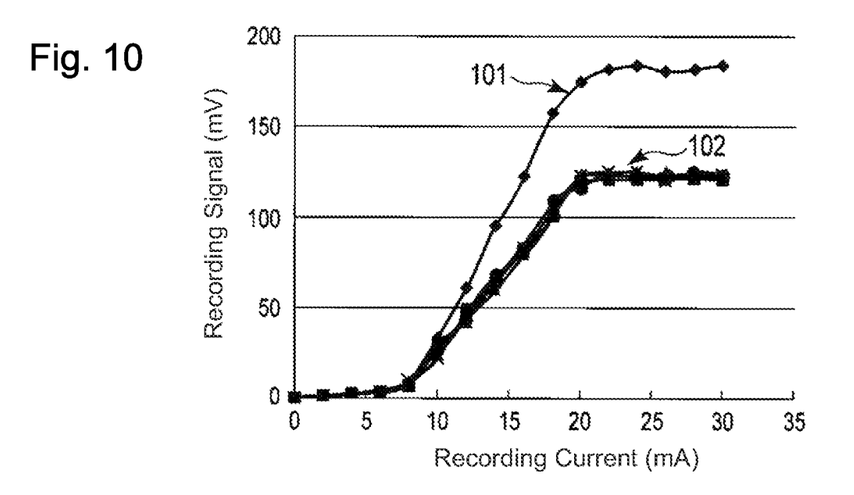
FIG. 10 is a graph showing a relationship between a recording current and intensity of a recording signal, according to examples of the first embodiment.

FIG. 10 shows the results of the recording signals with respect to the above-mentioned samples of the first cooling layers 1050 of the first embodiment. In FIG. 10, a graph 101 shows the result of the recording signals in a case where $Co_2FeSi$ is used for the first cooling layer 1050 and a current direction is upward. A case where $Co_2FeSi$ is used for the first cooling layer and a current direction is downward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 10, only in the case where $Co_2FeSi$ is used for the first cooling layer 1050 and the current direction is upward, larger recording signals can be obtained in comparison with the result of the case without assist.

Figure 11:
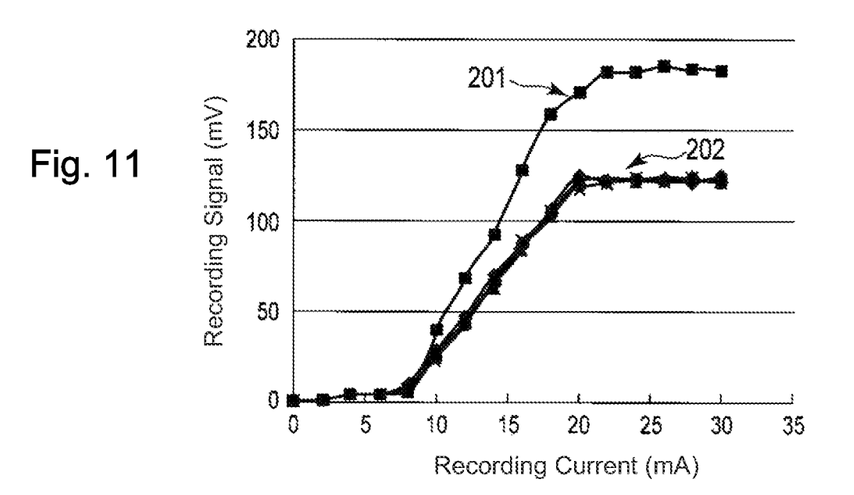
FIG. 11 is a graph showing a relationship between a recording current and intensity of a recording signal, according to examples of the second embodiment.

FIG. 11 shows the results of the recording signals with respect to the above-mentioned samples of the first cooling layers 1050 of the second embodiment. In FIG. 11, a graph 201 shows the result of the recording signals in a case where $Co_2FeSi$ is used for the first cooling layer 1050 and a current direction is downward. A case where $Co_2FeSi$ is used for the first cooling layer and a current direction is upward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 11, only in the case where $Co_2FeSi$ is used for the first cooling layer 1050 and the current direction is downward, larger recording signals can be obtained in comparison with the result of the case without assist.

Figure 12:
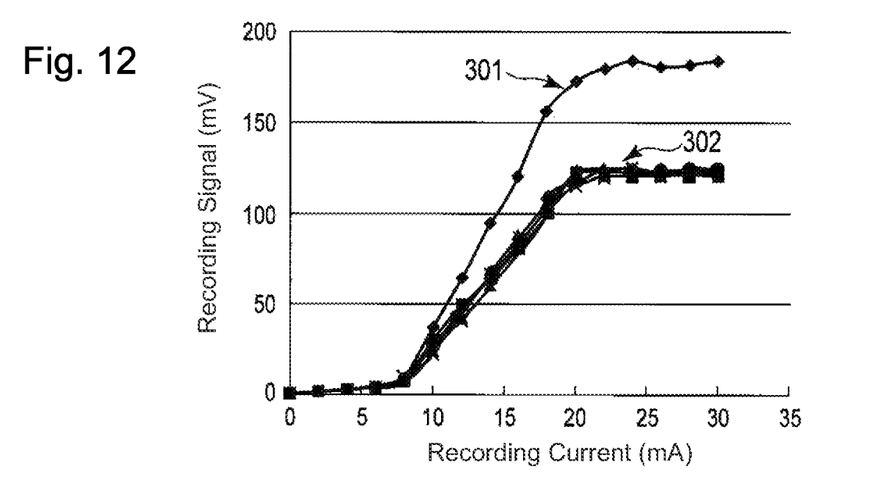
FIG. 12 is a graph showing a relationship between a recording current and intensity of a recording signal, according to examples of the third embodiment.

FIG. 12 shows the results of the recording signals with respect to the above-mentioned samples of the first cooling layers 1050 of the third embodiment. In FIG. 12, a graph 301 shows the result of the recording signals in a case where $Co_2FeSi$ is used for the first cooling layer 1050 and a current direction is upward. A case where $Co_2FeSi$ is used for the first cooling layer and a current direction is downward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 12, only in the case where $Co_2FeSi$ is used for the first cooling layer 1050 and the current direction is upward, larger recording signals can be obtained in comparison with the result of the case without assist.

Figure 13:
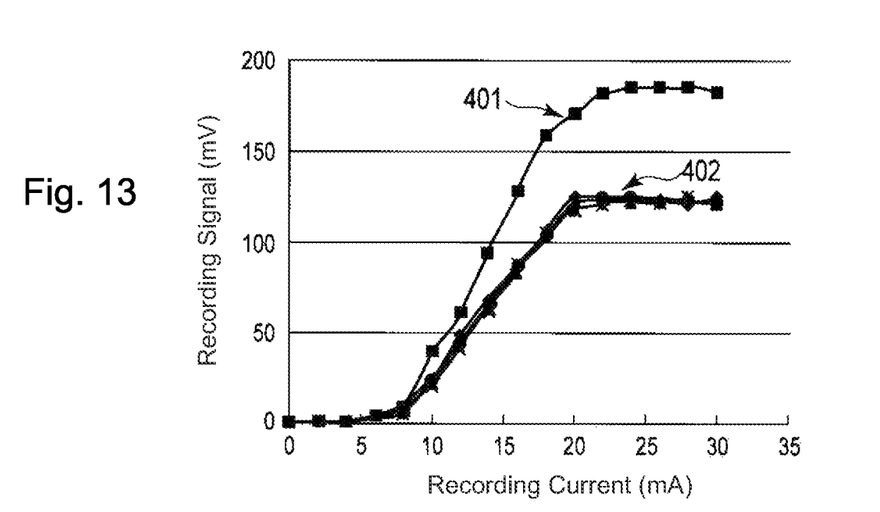
FIG. 13 is a graph showing a relationship between a recording current and intensity of a recording signal, according to examples of the fourth embodiment.

FIG. 13 shows the results of the recording signals with respect to the above-mentioned samples of the first cooling layers 1050 of the fourth embodiment. In FIG. 13, a graph 401 shows the result of the recording signals in a case where $Co_2FeSi$ is used for the first cooling layer 1050 and a current direction is downward. A case where $Co_2FeSi$ is used for the first cooling layer and a current direction is upward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 13, only in the case where $Co_2FeSi$ is used for the first cooling layer 1050 and the current direction is downward, larger recording signals can be obtained in comparison with the result of the case without assist.

Figure 14:
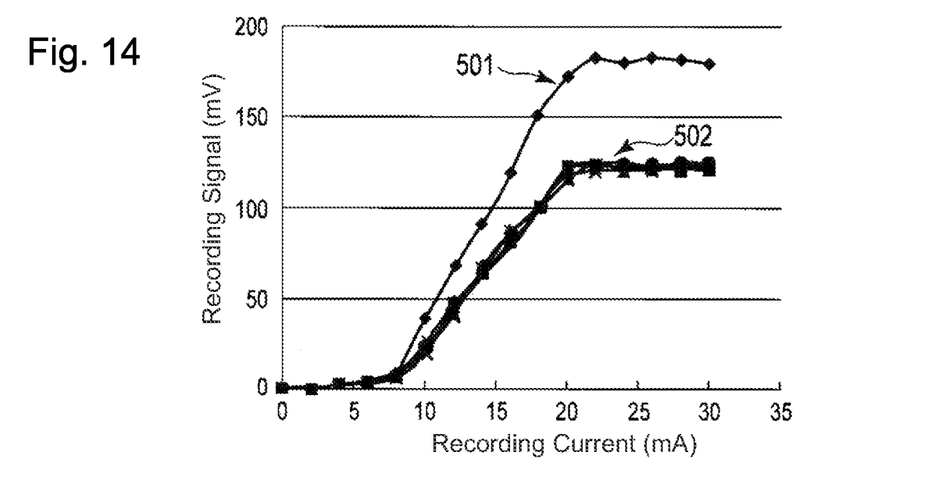
FIG. 14 is a graph showing a relationship between a recording current and intensity of a recording signal, according to examples of the fifth embodiment.

FIG. 14 shows the results of the recording signals with respect to the above-mentioned samples of the first cooling layers 1050 of the fifth embodiment. In FIG. 14, a graph 501 shows the result of the recording signals in a case where Co2FeSi is used for the first cooling layer 1050 and a current direction is upward. A case where $Co_2FeSi$ is used for the first cooling layer and a current direction is downward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 14, only in the case where $Co_2FeSi$ is used for the first cooling layer 1050 and the current direction is upward, larger recording signals can be obtained in comparison with the result of the case without assist.

Figure 15:
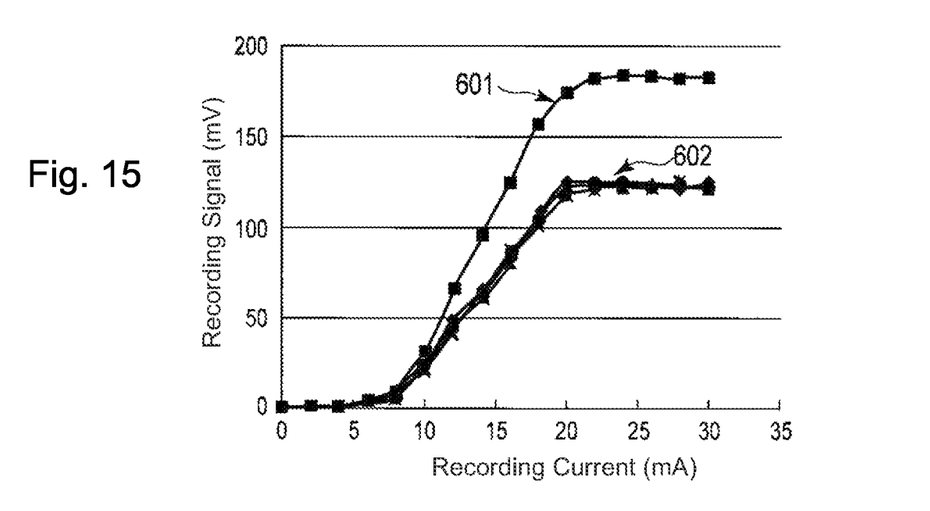
FIG. 15 is a graph showing a relationship between a recording current and intensity of a recording signal, according to examples of the sixth embodiment.

FIG. 15 shows the results of the recording signals with respect to the above-mentioned samples of the first cooling layers 1050 of the sixth embodiment. In FIG. 15, a graph 601 shows the result of the recording signals in a case where $Co_2FeSi$ is used for the first cooling layer 1050 and a current direction is downward. A case where $Co_2FeSi$ is used for the first cooling layer and a current direction is upward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 15, only in the case where $Co_2FeSi$ is used for the first cooling layer 1050 and the current direction is downward, larger recording signals can be obtained in comparison with the result of the case without assist.

Figure 16:
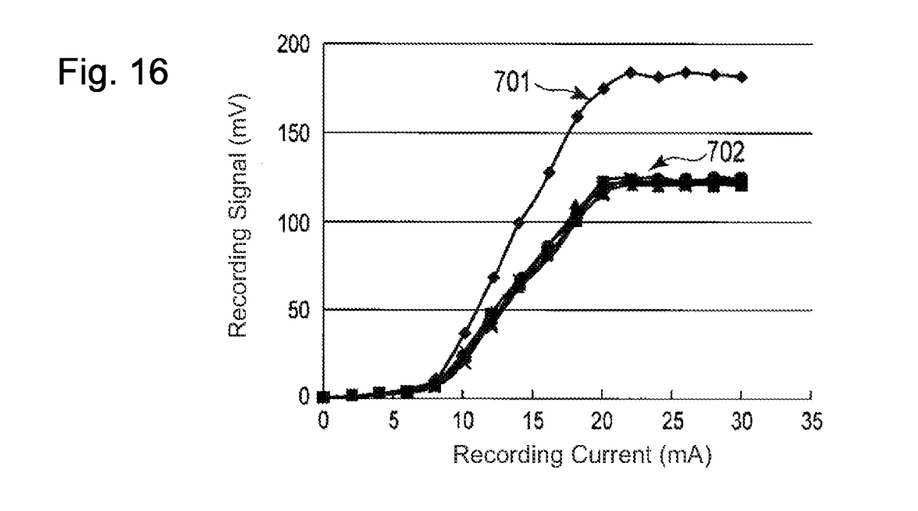
FIG. 16 is a graph showing a relationship between a recording current and intensity of a recording signal, according to examples of the seventh embodiment.

FIG. 16 shows the results of the recording signals with respect to the above-mentioned samples of the first cooling layers 1050 of the seventh embodiment. In FIG. 16, a graph 701 shows the result of the recording signals in a case where $Co_2FeSi$ is used for the first cooling layer 1050 and a current direction is upward. A case where $Co_2FeSi$ is used for the first cooling layer and a current direction is downward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 16, only in the case where $Co_2FeSi$ is used for the first cooling layer 1050 and the current direction is upward, larger recording signals can be obtained in comparison with the result of the case without assist.

Figure 17:
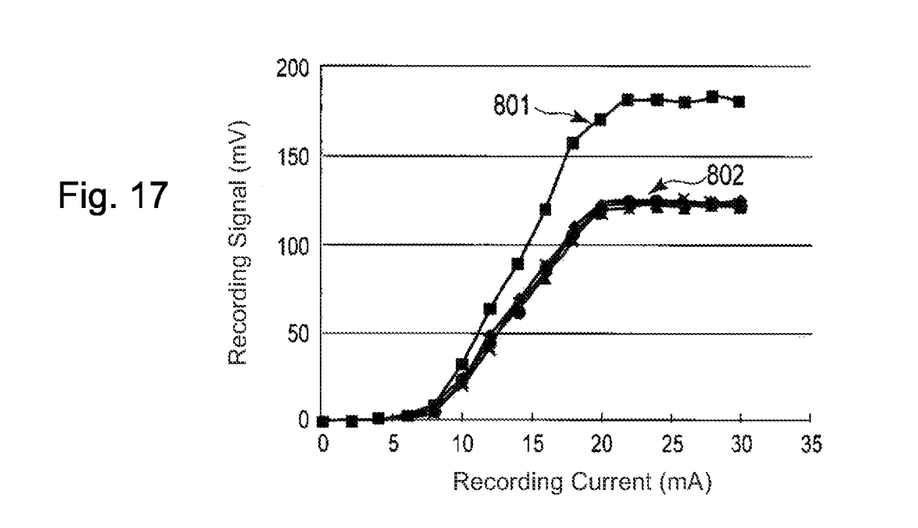
FIG. 17 is a graph showing a relationship between a recording current and intensity of a recording signal, according to examples of the eighth embodiment.

FIG. 17 shows the results of the recording signals with respect to the above-mentioned samples of the first cooling layers 1050 of the eighth embodiment. In FIG. 17, a graph 801 shows the result of the recording signals in a case where Co2FeSi is used for the first cooling layer 1050 and a current direction is downward. A case where $Co_2FeSi$ is used for the first cooling layer and a current direction is upward; a case where $Co_2MnGe$ is used for the first cooling layer and a current direction is upward; a case where $Co_2MnGe$ is used for the first cooling layer and a current direction is downward; a case where $Co_2MnAl$ is used for the first cooling layer and a current direction is upward; a case where $Co_2MnAl$ is used for the first cooling layer and a current direction is downward; a case where $Co_2MnSi$ is used for the first cooling layer and a current direction is upward; a case where $Co_2MnSi$ is used for the first cooling layer and a current direction is downward; and cases without the high frequency magnetic field assist thereof.

As shown in FIG. 17, only in the case where $Co_2FeSi$ is used for the first cooling layer 1050 and the current direction is downward, larger recording signals can be obtained in comparison with the result of the case without assist.

Another Example

Figure 18:
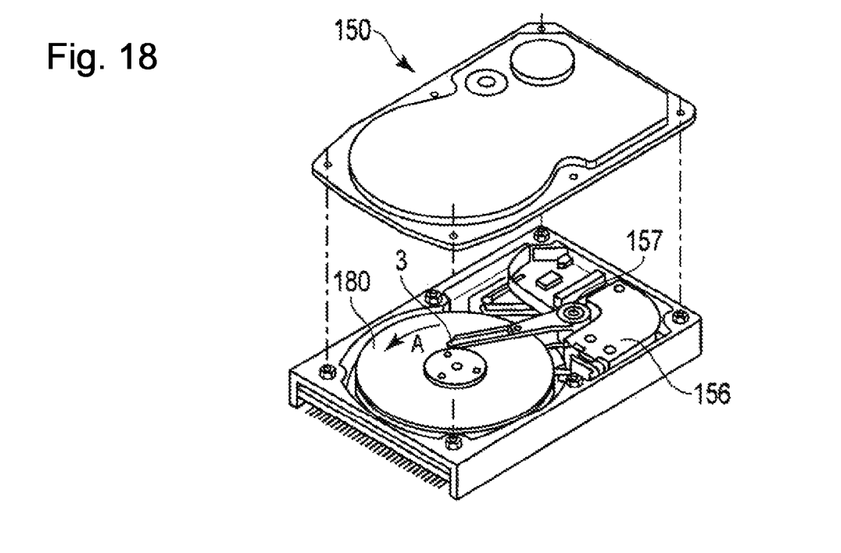
FIG. 18 is a perspective view of a magnetic recording-reproducing device in which a magnetic head according to the embodiments can be mounted.

FIG. 18 is a main part perspective view that exemplifies a schematic configuration of a magnetic recording-reproducing device in which the magnetic head according to the above-mentioned embodiments can be mounted.

A magnetic recording-reproducing device 150 uses a rotary actuator to move the head. In the figure, a recording medium disk 180 is attached to a spindle 152 and rotates in the direction of an arrow A by a motor (not shown in FIG. 18) that responds to a control signal from a control part of a drive device (not shown in FIG. 18). The magnetic recording-reproducing device 150 according to the embodiments may include a plurality of the magnetic disks 180.

A head slider 3 that performs recording of data to store in the medium disk 180 and reproducing of data stored in the medium disk 180 is attached to a front end of a suspension 154, which is formed in a thin film shape. Herein, the head slider 3 includes the magnetic recording head according to one of the above-described embodiments, for example, and the magnetic recording head is mounted near a front end of the head slider 3.

When the medium disk 180 rotates, an air bearing surface (ABS) of the head slider 3 is held at a predetermined height from the surface of the medium disk 180. Alternatively, a so-called "running-in-contact type" slider, in which the slider contacts the medium disk 180, may be applied.

The suspension 154 is connected to one end of an actuator arm 155 that includes a bobbin part that holds a drive coil (not shown in FIG. 18), etc. On the other end of the actuator arm 155, a voice coil motor 156, a type of arcuate motors, is provided. The voice coil motor 156 is comprised of a drive coil (not illustrated) that is wound around the bobbin part of the actuator arm 155, permanent magnets arranged to sandwich the coil and face each other, and yokes.

The actuator arm 155 is held by ball bearings (not shown in FIG. 18) that are provided above and below the spindle 157 and can rotate by driving the voice coil motor 156.

FIG. 19 is an enlarged perspective view of one example of a magnetic head assembly from a disk side. The magnetic head assembly 160 includes the actuator arm 155 including the bobbin part that holds the drive coil, for example, and the suspension 154 that is connected to one end of the actuator arm 155.

In the tip end of the suspension 154, the head slider 3 is attached, and the head slider 3 includes a magnetic recording head according to the above-mentioned embodiments. The suspension 154 includes the lead lines 164 for writing and reading signals, and these lead lines 164 and electrodes of the magnetic head incorporated in the head slider 3 are electrically connected to each other. The reference number 162 in FIG. 19 denotes electrode pads of the magnetic head assembly 160.

Figure 20:
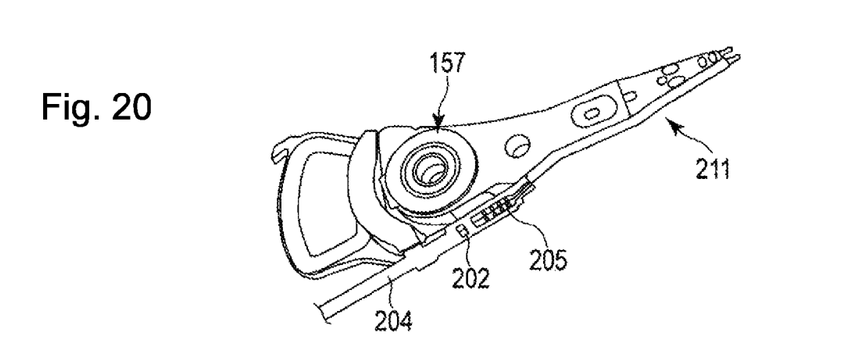
FIG. 20 is a schematic view of a magnetic head stack assembly according to the embodiments.

FIG. 20 is a schematic view of a magnetic head stack assembly.

As illustrated in FIG. 20, a magnetic head stack assembly 211 includes a plurality of suspensions, which are stacked to sandwich a spacer therebetween, and a FPC carriage connection part that is electrically connected to a wire pattern on the suspensions. The FPC carriage connection part 204 includes a conductive copper foil pattern 205 and a head amplifier 202 that is electrically connected to the copper foil pattern 205 and amplifies signals read out from the magnetic head.

In the magnetic disk device, when data is recorded in the magnetic disk 180, a writing current is supplied from the head amplifier 202 to the magnetic head. When data recorded in the magnetic disk 180 is reproduced, the head amplifier 202 amplifies a current detected by the magnetic head.

Note, in the above-described magnetic head stack assembly 211, the head amplifier 202 is mounted on the FPC carriage connection part 204. However, it is also possible to dispose the head amplifier 202 on the suspension by connecting the head amplifier 202 to the lead line 164.

While certain embodiments have been described, these embodiments have been presented by way of example only; and are not intended to limit the scope of the inventions. Indeed, the novel embodiments described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirits of the inventions.

What is claimed is:

1. A magnetic head, comprising:
   a main magnetic pole;
   a trailing shield that forms a magnetic circuit with the main magnetic pole;
   a spin torque oscillator that is provided between the main magnetic pole and the trailing shield;
   a first cooling layer that at least partially has a Heusler structure and is arranged with respect to the spin torque oscillator to cause cooling thereof; and
   a second cooling layer that is provided on the first cooling layer and mainly comprised of silver, and is arranged with respect to the spin torque oscillator to cause cooling thereof, wherein
   the first cooling layer and the second cooling layer are provided between the trailing shield and the spin torque oscillator.

2. The magnetic head according to claim 1, wherein the first cooling layer is disposed closer to the spin torque oscillator than the second cooling layer.

3. The magnetic head according to claim 2, further comprising:
   a third cooling layer that is provided between the first cooling layer and the spin torque oscillator.

4. The magnetic head according to claim 1, wherein the second cooling layer is disposed closer to the spin torque oscillator than the first cooling layer.

5. The magnetic head according to claim 4, further comprising:
   a third cooling layer that is provided between the first cooling layer and the trailing shield.

6. The magnetic head according to claim 1, wherein a main component of the first cooling layer is $Co_2FeSi$.

7. The magnetic head according to claim 1, wherein the spin torque oscillator includes an oscillation layer, a spin injection layer, and an intermediate layer that is formed between the oscillation layer and the spin injection layer.

8. A magnetic head assembly, comprising:
   a head slider;
   a suspension on one end of which the head slider is mounted;
   an actuator arm connected to another end of the suspension; and
   a magnetic head mounted on the head slider and including a main magnetic pole;

a trailing shield that forms a magnetic circuit with the main magnetic pole;

a spin torque oscillator that is provided between the main magnetic pole and the trailing shield;

a first cooling layer that at least partially has a Heusler structure and is arranged with respect to the spin torque oscillator to cause cooling thereof; and a second cooling layer that is provided on the first cooling layer and mainly comprised of silver, and is arranged with respect to the spin torque oscillator to cause cooling thereof; wherein the cooling layers are provided between the spin torque oscillator and the trailing shield.

9. The magnetic head assembly according to claim 8, wherein a main component of the first cooling layer is $Co_2FeSi$.

10. The magnetic head assembly according to claim 8, wherein the spin torque oscillator includes an oscillation layer, a spin injection layer, and an intermediate layer that is formed between the oscillation layer and the spin injection layer.

11. The magnetic head assembly according to claim 8, wherein the first cooling layer is formed on the spin torque oscillator.

12. The magnetic head assembly according to claim 8, wherein the second cooling layer is formed on the spin torque oscillator.

13. The magnetic head assembly according to claim 8, further comprising:

a third cooling layer that is formed to be in contact with the first cooling layer.

* * * * *